United States Patent
Bendi et al.

(10) Patent No.: US 9,775,009 B2
(45) Date of Patent: Sep. 26, 2017

(54) METHOD AND SYSTEM FOR COORDINATING A COMMUNICATION RESPONSE

(71) Applicant: Cellco Partnership, Basking Ridge, NJ (US)

(72) Inventors: Sethumadhav Bendi, Walnut Creek, CA (US); Guangxin Frank Liu, San Ramon, CA (US); Chi Kit Ben Lo, Danville, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/259,958

(22) Filed: Apr. 23, 2014

(65) Prior Publication Data

US 2015/0312731 A1 Oct. 29, 2015

(51) Int. Cl.
*H04W 4/12* (2009.01)
*H04M 3/42* (2006.01)
*H04M 3/436* (2006.01)

(52) U.S. Cl.
CPC ......... *H04W 4/12* (2013.01); *H04M 3/42042* (2013.01); *H04M 3/42161* (2013.01); *H04M 3/42365* (2013.01); *H04M 3/436* (2013.01)

(58) Field of Classification Search
CPC ............... H04W 4/12; H04M 3/42042; H04M 3/42161; H04M 3/436
See application file for complete search history.

(56) References Cited

U.S. PATENT DOCUMENTS

| | | | |
|---|---|---|---|
| 8,032,121 B2* | 10/2011 | Kwon | H04M 3/53308 379/88.25 |
| 2006/0172709 A1* | 8/2006 | Eyer et al. | 455/90.3 |
| 2007/0275698 A1* | 11/2007 | Kuiken et al. | 455/414.1 |
| 2008/0249778 A1* | 10/2008 | Barton | H04L 12/581 704/270 |
| 2008/0263158 A1* | 10/2008 | del Cacho | G06Q 10/107 709/206 |
| 2009/0170492 A1* | 7/2009 | Lee | 455/418 |
| 2009/0311992 A1* | 12/2009 | Jagetiya | 455/412.1 |
| 2014/0314219 A1* | 10/2014 | Cooper | 379/88.13 |

* cited by examiner

*Primary Examiner* — Marcos Torres

(57) ABSTRACT

An approach for coordinating a communication response is described. A response coordination platform determines delivery of a notification to at least one device associated with a user. The response coordination platform further determines, based on the delivery, messaging content, a user specified response time, or a combination thereof for generating a message for responding to the notification. The response coordination platform then generates, based on the response time, at least one instruction for triggering an alert, a communication session, or a combination thereof by the at least one device associated with the user, other devices associated with the user, a device that sent the notification, or a combination thereof.

20 Claims, 13 Drawing Sheets

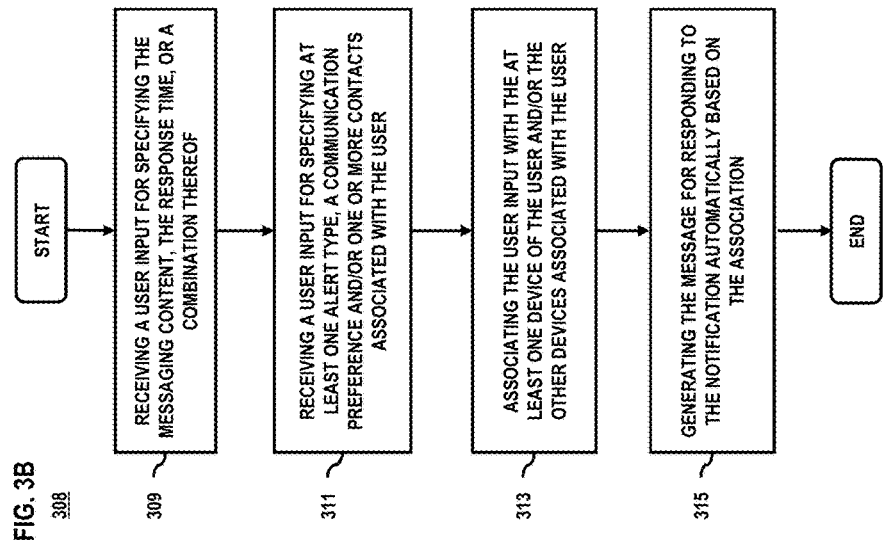
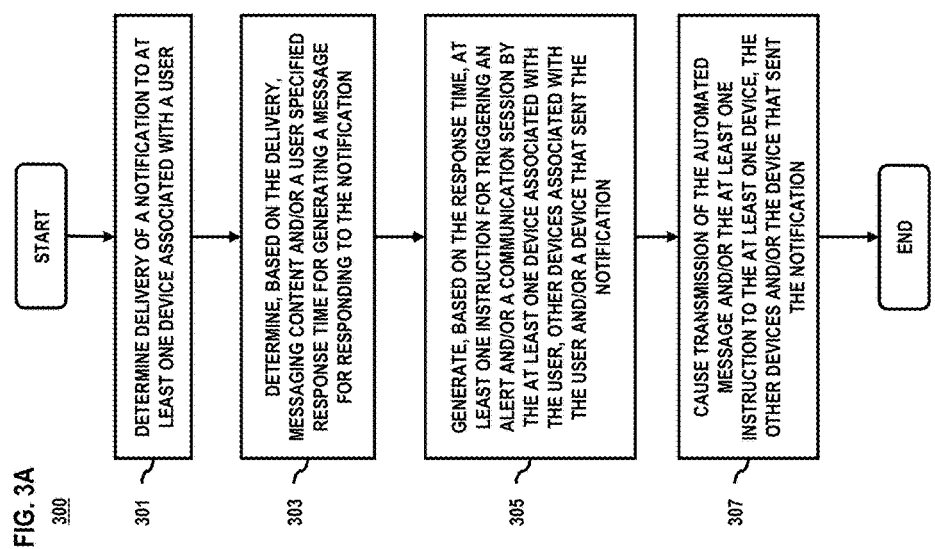

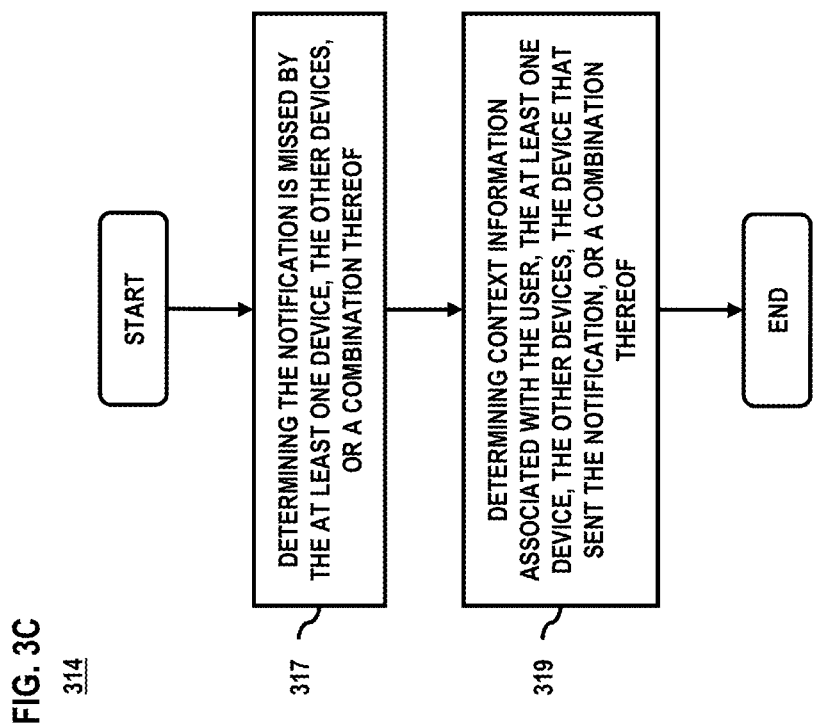

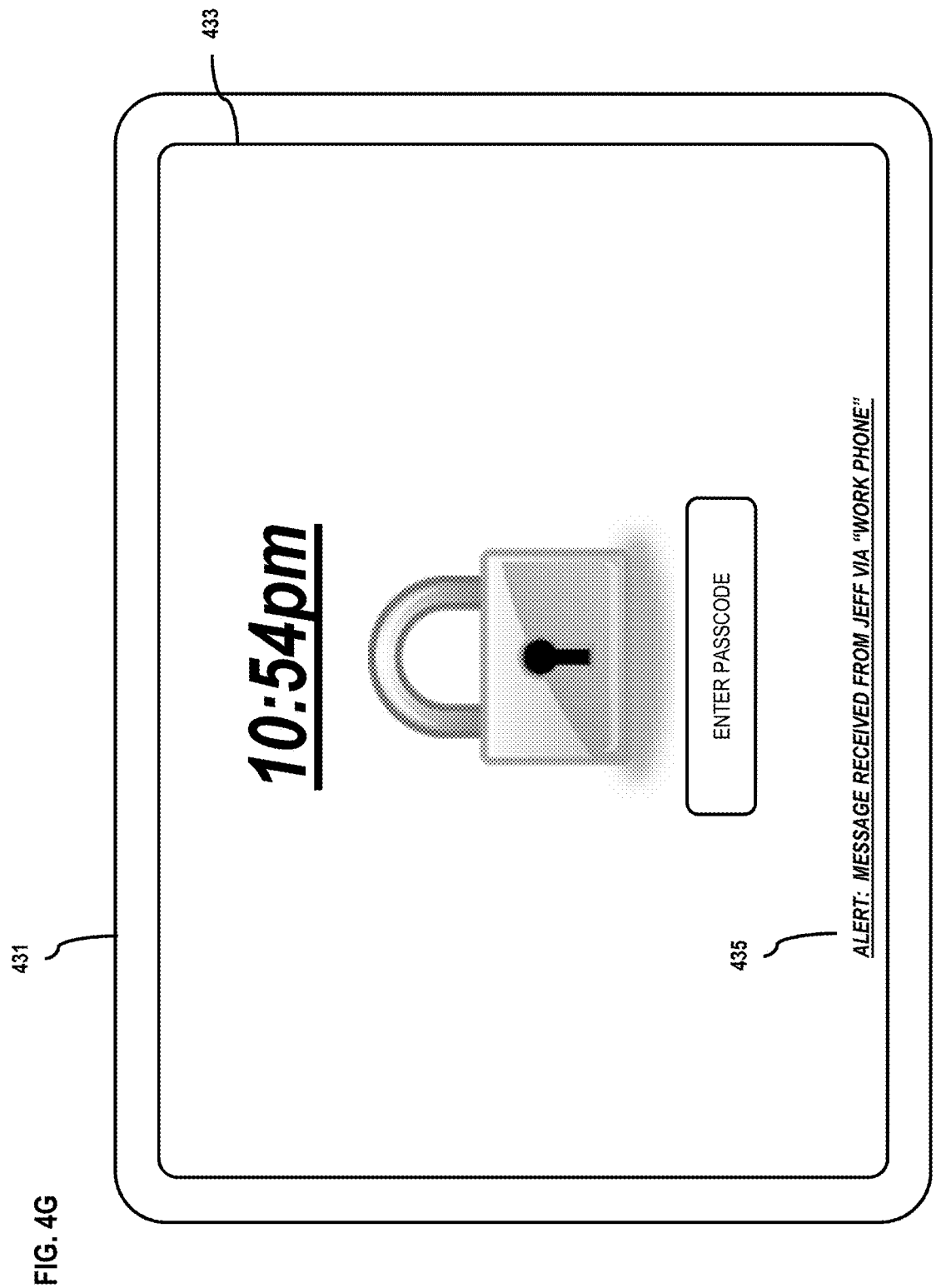

METHOD AND SYSTEM FOR COORDINATING A COMMUNICATION RESPONSE

BACKGROUND INFORMATION

Application developers and service providers are continually challenged to deliver value and convenience to consumers by providing compelling applications and communication services. One area of interest has been providing users with methods for responding to phone calls or other communications received by their different mobile devices in a timely, effective manner. For example, a user in possession of their work cell phone may not be aware of a call placed to their personal cell phone while it is at home. Resultantly, the user is not able to respond to the call until they gain access to the personal phone. Still further, even when the user is aware of a call but unable to answer at the time, the user may inadvertently forget to place a return call.

Based on the foregoing, there is a need for coordinating a communication response.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3C are flowcharts of processes for coordinating a communication response, according to various embodiments;

FIGS. 4A-4G are diagrams of user interfaces utilized in the processes of FIGS. 3A-3D, according to various embodiments;

DESCRIPTION OF THE PREFERRED EMBODIMENT

An apparatus, method and software for coordinating a communication response are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to phone calls, it is contemplated these embodiments have applicability to any means of communication. This may include, for example, communications generated according to known or still developing protocols and thus, may be an email, video call, short messaging service (SMS) message, virtual message or the like. As such, the communication may convey visual data, textual data, audible data, virtual data or a combination thereof. For the purpose of illustration, any communications generated and subsequently delivered to a user device within the context of a communication session are referred to herein as "notifications."

Figure 1:
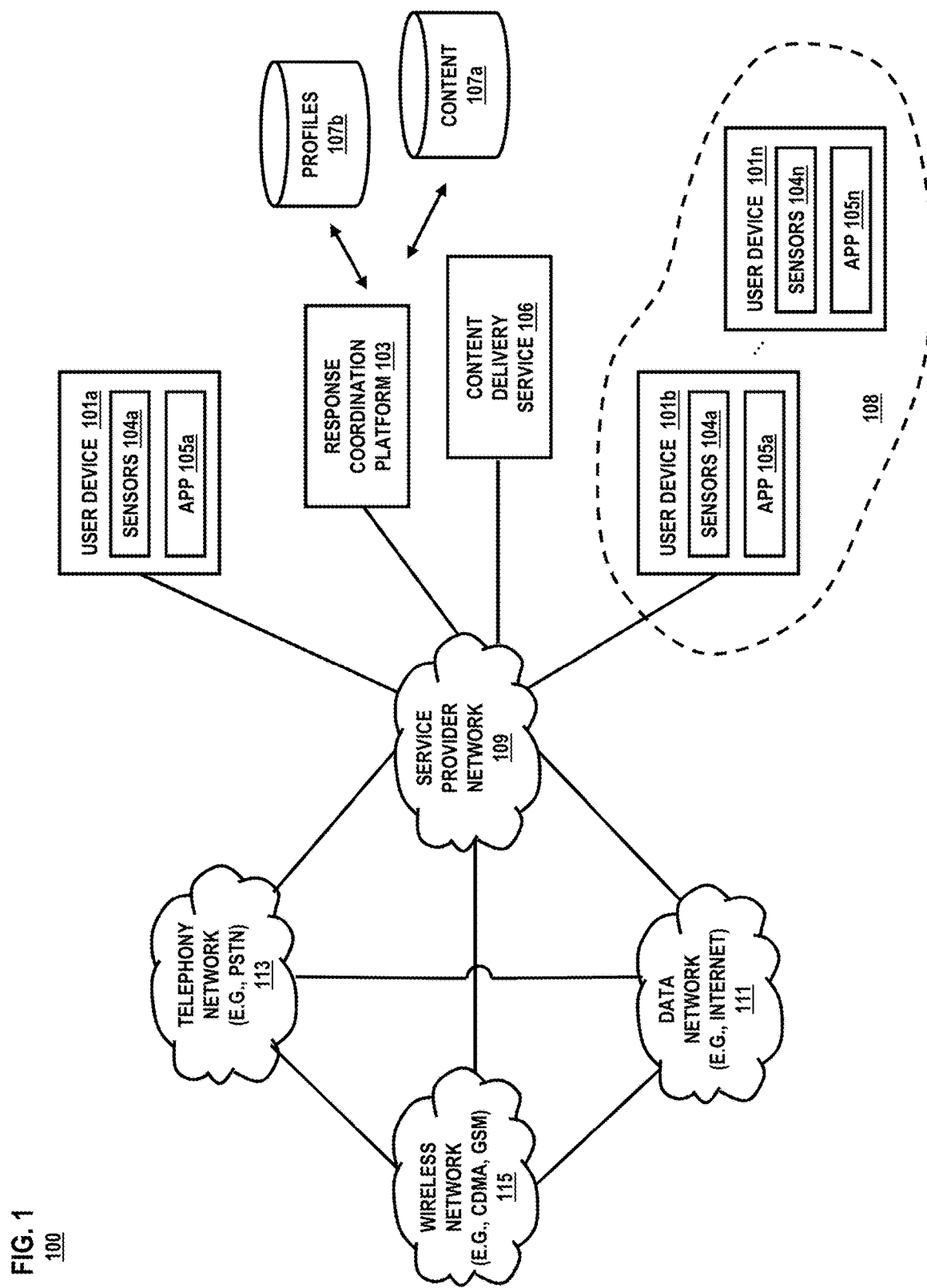
FIG. 1 is a diagram of a system for coordinating a communication response, according to one embodiment.

FIG. 1 is a diagram of a system for coordinating a timed response to a notification delivered to at least one device of a user across all of the user's devices, according to one embodiment. For example, system 100 is shown to include one or more user devices 101a-101n (e.g., mobile device, smart phone, netbook, laptop or any communications enabled computing device). The user devices 101a-101n, referred to herein as user devices 101, are configured to communicate with one another via a communication network, i.e., service provider network 109. The user devices 101 may feature applications 105a-105n, referred to herein as applications 105, for initiating a communication session with any other device via the network.

In addition, the user devices 101 may also feature one or more sensors 104a-104n, referred to herein as sensors 104, for gathering context information regarding the user, the user device 101, the other user devices, a current operating environment of the user device, or a combination thereof. By way of example, the context information may include, for example, location information, temporal information, network information, position information and other data. This data may be used by the application 105 to facilitate the communication session or various features thereof. For example, a video chat application may process the context information in order to determine current lighting conditions for adjusting video and/or image capture for a video chat session while a calling application may detect sound levels for performing noise reduction during a phone call. It is noted that the embodiments presented herein may pertain to any means of interaction between the user devices 101, sensors 104 and applications 105 for enabling device-to-device communication via a network.

As noted above, when users receive incoming calls, they typically have the option of accepting the call, declining the call or responding to the caller by sending a short messaging system (SMS) response message. The response message may include preconfigured content for indicating the user's current availability or lack thereof, an action that will be taken by the user responsive to the call, etc. For example, a call application of the user may feature standard responses such as "I'll call you right back" or "I can't talk right now." As another example, the response message may include instructions for the caller to follow, i.e., "I'm in a meeting. Please send me a text." Still further, the user may generate a custom message for responding to the call. The response message is a convenient way for the user to at least acknowledge receipt of the phone call without directly accepting it or just letting the call go to voicemail by default.

In many instances, even when the user responds by way of a text message to suggest they will call the caller back, it is common for the user to forget to follow up. For example, in the case where a user is in an important meeting when they receive the call, the user may get distracted by other priorities and forget to return the call. This inaction on the part of the user diminishes the perceived sincerity of the response message provided by the user in lieu of accepting the call. In addition, the user has no means of recalling they are to make the call.

Also, in some cases, the user may be unable to send a response message to callers when they are without their mobile device. For example, the user may forget their cell phone at home, resulting in them missing multiple calls while they are at their place of work. Currently, there is no convenient way for the user to notify callers that an alternative mode of communication is preferred due to their lack of access to the cell phone. Furthermore, in the case where the user employs multiple devices (e.g., a personal cell phone, work related cell phone, tablet and personal computer), there is currently no means for enabling a call placed to one of the devices to be immediately responded to by the user from any of their other devices. Rather, the user in not even aware of the call unless the phone is currently active and in their possession.

To address this issue, system 100 presents a response coordination platform 103 that operates in connection with the various user devices 101 to facilitate a procedure for responding to notifications delivered to a user by another user device. By way of example, the response coordination platform 103 enables various functions to be performed by one or more devices of a user, including (a) facilitating generation of customized messaging content for automatically crafting a message to respond to a received notification (i.e., a call), (b) associating a user specified/configurable response time with said messaging content, (c) generating an instruction for triggering an alert at one or more devices of a user that received the notification (i.e., a call), (d) generating an instruction for triggering a communication session at one or more devices of a user that received the notification, or (e) a combination thereof. The platform 103 also facilitates delivery of the message and/or instruction accordingly.

In one embodiment, the response coordination platform 103 manages the exchange of data between a caller that sends a notification (e.g., places a call), i.e., via a calling device 101a, and any one of a plurality of devices belonging to a common user that receives said notification, i.e., user devices 101b-101n. For the purpose of illustration herein, the calling device 101a generates and subsequently delivers a notification to at least one device of the group of devices 101b-101n, referred to herein collectively as device group 108. The notification is delivered per formation of a communication session via a network 109. The session may be further carried out based on the response of the user to notifications as well as the processing of notifications by applications 105 and the response coordination platform 103.

In one embodiment, the response coordination platform 103 initiates execution of various application programming interfaces (APIs) of the application 105 for enabling user selection of and/or automated sending of customized response messages. Per this execution, the customized response message may be configured as a SMS message for specifying an expected time of response of the receiving user. The response coordination platform 103 may render various buttons, menus or other graphical elements for acquiring user input for responding to notifications. For example, when a notification is received, the user interface of the application 105 may render a content selection menu featuring different messaging content. The messaging content may be maintained in a content database 107a, optionally acquired from a content delivery service 106 associated with the response coordination platform 103, or a combination thereof. In the latter case, the content delivery service 106 may be a data feed for interfacing with various content providers such as news feeds, social networking service providers, media providers, etc. As such, the user may access a robust array of messaging content from various sources and of varying types (e.g., famous quotes, images, audio).

By way of example, one messaging content option may read "I'll call you back in X minutes," where X is a value capable of being specified by the user. As another example, messaging content may be presented for selection as acquired from a famous quotation website that reads "In all our deeds, the proper value and respect for time determines success or failure—Malcolm X. I will call you back in Y minutes," where the value of Y may be set by the user. As yet another example, the user may be presented with the option of generating custom messaging content for tailoring their message for the caller, i.e., "John, I'm in a meeting with the caterer. Call you at X." In this case, X is a value capable of being specified by the user. It is noted that the content may be presented to the user as a selection menu and/or list via the user interface of the application 105.

In one embodiment, the user specifies the response time to associate with the messaging content. The response time may be configured by the user as a specific time of day (e.g., 11:31 a), a duration of time (e.g., 5 minutes) to occur later/elapse, such as from the time of receipt or acceptance of the notification from the caller or the like. For example, in the case where the user specifies a value of 13 to correspond to a number of minutes as referenced in a message ("X minutes") or a specific time of day of 11:31 a for representing a time as referenced in the message. Once configured, the response message generated for the caller reads as "I'll call you back in 13 minutes" or "John, I'm in a meeting with the caterer. Call you at 11:31 a." It is noted that by enabling the user to customize the response time, the user is better able to regulate their responses and more accurately communicate their availability. This is in contrast to limiting the user to selecting of only a default response time (e.g., 15 minutes, 30 minutes, 12:30 pm).

While described in the above examples as an SMS message, the response message may be generated and/or transmitted to the caller in various forms. The messaging format and/or protocol of the notification may vary depending on the requirements and executions of the application 105 that received the notification from the caller. For example, in the case where the notification was received by the user device initially as a video call request per a video conferencing application 105, the response message may be generated in like form. The response coordination platform 103 supports generation of messaging content regardless of the format, transmission protocol, etc. As will be discussed later, the platform 103 may also support user specification of the response message type, format, protocol, etc., based on a user profile.

In one embodiment, the response coordination platform 103 generates an instruction to trigger an alert at the user device that received the notification, i.e., at least one of the devices of the group 108. The alert is generated along with the response message and is set to occur at the response time (or at the elapse thereof) specified by the user. By way of example, the instruction may include setting a calendar reminder, alarm, event prompt or other application of the user device along with the setting of alert/alarm preferences (e.g., sound intensity, vibration on or off). In keeping with the example cited earlier, when the response time is set at 13 minutes, an alarm may also be triggered to occur at the user device at after 13 minutes has elapsed; resulting in activation of a sound or vibration signal, blinking of a laser emitting diode (LED) of the user device, presentment of a message to the display (e.g., "Reminder: Return call to John at 312-790-1233"), or a combination thereof. In the case where the user unavailable at the time of the alert, a snooze setting may be activated accordingly. By way of this approach, the user is automatically reminded to respond to the caller and encouraged to do so at the most suitable time.

In one embodiment, the response coordination platform 103 may also trigger performance of an automated response procedure. The automated response procedure may be triggered to occur at the response time. By way of example, the platform 103 may initiate execution of one or more API executions of the application 105 of the user device for launching a phone session (auto-dial), an email communication session, a video chat/conferencing session, etc. The user may enable this execution during the time of selection and/or configuring of the response message, i.e., select a checkbox for permitting auto-dial. In the previous example where the response time was set to occur after 13 minutes, the user device 101 may automatically dial the phone number associated with the caller device 101a. Alternatively, a video chat session, email communication session or the like may automatically be invoked to occur with respect to the phone number, session identifier, email address, etc., of the caller. It is noted that, per this approach, the communication session for enabling user response to a notification is automatically performed at a time configured by the user.

It is noted that the platform 103 enables user input to be acquired for generating a response message at the time of delivery of the notification, in advance of delivery of a notification, or a combination thereof. In the former case, the user is prompted at the time of receipt of a notification (e.g., in-call/inline) to provide the necessary input for generating a response message. This corresponds to an interactive or inline response approach, wherein the user directly specifies the messaging content and response time at the moment of notification. In the latter case, the user generates a profile for specifying instructions for generating the response message. The profile is stored to a profile database 107b for access when a notification is received by a corresponding user device of the group 108. This corresponds to an automated or offline response approach, wherein the user pre-configures the messaging content and response time. Hence, the user profile enables the platform 103 to operate in connection with the application 105 for responding to notifications when the user device is offline, when the user is unavailable or incapable of providing a manual input (e.g., missed a call), when a user device of the group 108 is unavailable to the user, or a combination thereof.

In one embodiment, the response coordination platform 103 generates a configuration interface for enabling the user to establish a profile. The configuration interface may include one or more action buttons, menu selection options, data fields or other input elements for acquiring user specified instructions, conditions or details for generating a response message. It is noted that the configuration interface may be invoked as an execution of the application 105. Alternatively, the configuration interface may be accessed by way of a network portal for interfacing with the platform 103. The configuration interface may be accessed on demand and/or during initial registration of the one or more user devices of the group 108 with the response coordination platform 103.

In one embodiment, the user profile may include user identification information, such as name information, network carrier information, customer identifier or the like. The profile may further specify each of the devices associated with the user, i.e., per the group 108. This may include a phone number, a device identifier, a device type, a network identifier, network interface card information or the like for each device. Identifying each of the user devices of the user enables the response coordination platform 103 to facilitate the exchange of data between the devices for responding to notifications from a calling device 101a. For instance, the response coordination platform 103 may identify which device(s) of the group 108 to transmit missed call notifications or alerts based on the association and response messaging preferences of the user. More regarding this execution will be discussed further later on.

Still further, the profile may specify one or more instructions for generating the response message. This may include, for example, specifying various preconfigured messaging content to be used for generating a response message. Alternatively, the profile may indicate a resource location, file or identifier of a content delivery service 106 from which the user specified messaging content may be acquired. Of note, the messaging content may include graphical, textual or audio content for generating the response message.

In one embodiment, the profile may also enable one or more advanced profile settings to be configured by the user. This may include the establishing of instructions and/or data for supporting conditional response message generation. The conditional settings may be based, for example, on schedule information related to the user, one or more notification acceptance or rejection conditions of the user (e.g., prevent call acceptance when the user is exercising), one or more caller identification conditions, one or more response message timing conditions (e.g., conditional delay of a response message), response time settings and/or variance thresholds (e.g., a 10 minute variance for automatic setting of response times), etc. In addition to enabling user based conditions, they may also be established with respect to the caller, the group of devices 108, the environment associated with the group of devices 108, or a combination thereof. It is noted that contextual information may be processed by platform 103 for validating fulfillment of the one or more user conditions.

By way of example, contextual information may be gathered by the sensors 104 of the user devices 101, various network components or devices within proximity of the user devices 101, applications 105 of the user devices of the group 108, or a combination thereof. The contextual information may include speed data, position data, location data, tilt data, motion data, light data, sound data, image data, weather data, temporal data or the like. In addition, network and wireless signal information may be acquired along with device, application, service or operating system information related to the user, the caller or the user devices 101.

For the purpose of illustration herein, the following paragraphs describe one or more exemplary use cases for depicting the automated or offline response capability of the response coordination platform 103. As noted above, this mode of operation is executed based on the settings established per the user profile and may include execution of the various conditional settings. In a first example, the user profile may specify a data file, web address, data feed or resource location for indicating calendar information related to the user. This information may be processed by the response coordination platform 103 to determine user or device availability information. As such, when the user's schedule indicates they are in a meeting until 4 pm, the platform 103 may determine an appropriate response time for responding to a notification received at 3:48 pm. In this example, the platform 103 may automatically generate a response message that reads "I'm in a meeting. Call me back in 17 minutes." The 17 minute time interval is sufficient to account for the user's expected availability in 12 minutes along with a 5 minute variance.

In another example, the messaging content selected for generating a response message may be adapted based on determined caller conditions. For instance, in the case where a notification is received from a specific caller as identified by way of a call number, email address, social networking handle, internet protocol (IP) address or other caller identifier, the platform 103 may select messaging content tailored for this caller while other callers are presented with other messaging content. Hence, a notification received from the user's mother may result in generation of a response message that reads differently than a notification received from an unidentified caller.

In another example, the response message type or format may be adapted based on determined conditions or with respect to user preferences. In the case where the caller is the user's mother, the user profile may indicate a preference to generate and subsequently transmit the response message as a social networking service message as opposed to a text message. This may be established in advance by the user based on foreknowledge of the caller. It is noted that other conditional settings may further be established based on temporal information or current user activity information. The conditional settings established via the profile may vary based on preferences and requirements of the user.

In one embodiment, the response coordination platform 103 may be configured to transmit a missed call notification to each of the user devices specified by the user in response to a missed call by at least one device. This includes any of the user devices that comprise the group 108 as specified per the user profile. When a notification is missed, for example, by a personal device of the user, the platform 103 transmits a missed call notification to the work device, tablet, personal computer and any other network or communication ready device of the user. In this way, each device is notified of the missed call for increasing the likelihood that the user may be aware of and respond to a received notification.

In addition, the missed call notification may be transmitted along with an instruction for triggering an alert at that the user devices corresponding to the response time. Similarly, the instruction may trigger initiation of a communication session (e.g., auto-dial) for responding to the caller. Alternatively, the instruction may trigger initiation of an automated communication session, i.e., auto-dialing of the caller associated with the missed call. Per this execution, each device is configured to automatically alert the user of a missed notification regardless of which device the notification from the calling device 101a was delivered to (originally). As such, each of the devices of the group 108 are notified of the missed call and automatically configured to respond to the caller at the response time.

It is noted that, while described in such a manner as to denote different users, the user device 101a may be of identical make, manufacture or type as devices 101b-101n. Thus, the response coordination platform 103 may be configured to interface with any of the devices regardless of whether the device is a calling device 101a or device that receives a notification. The platform coordinates the exchange of notifications, alerts and instructions for enabling convenient, effective call response amongst a plurality of user devices. Of note, the user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101a-101n can support any type of interface for supporting the presentment or exchanging of data. In addition, user devices 101a-101n may facilitate various input means for receiving and generating information, including touch screen capability, keyboard and keypad data entry, voice-based input mechanisms and the like.

In certain embodiments, user devices 101a-101n, the response coordination platform 103, the application distribution service 102 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication networks 109-115 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
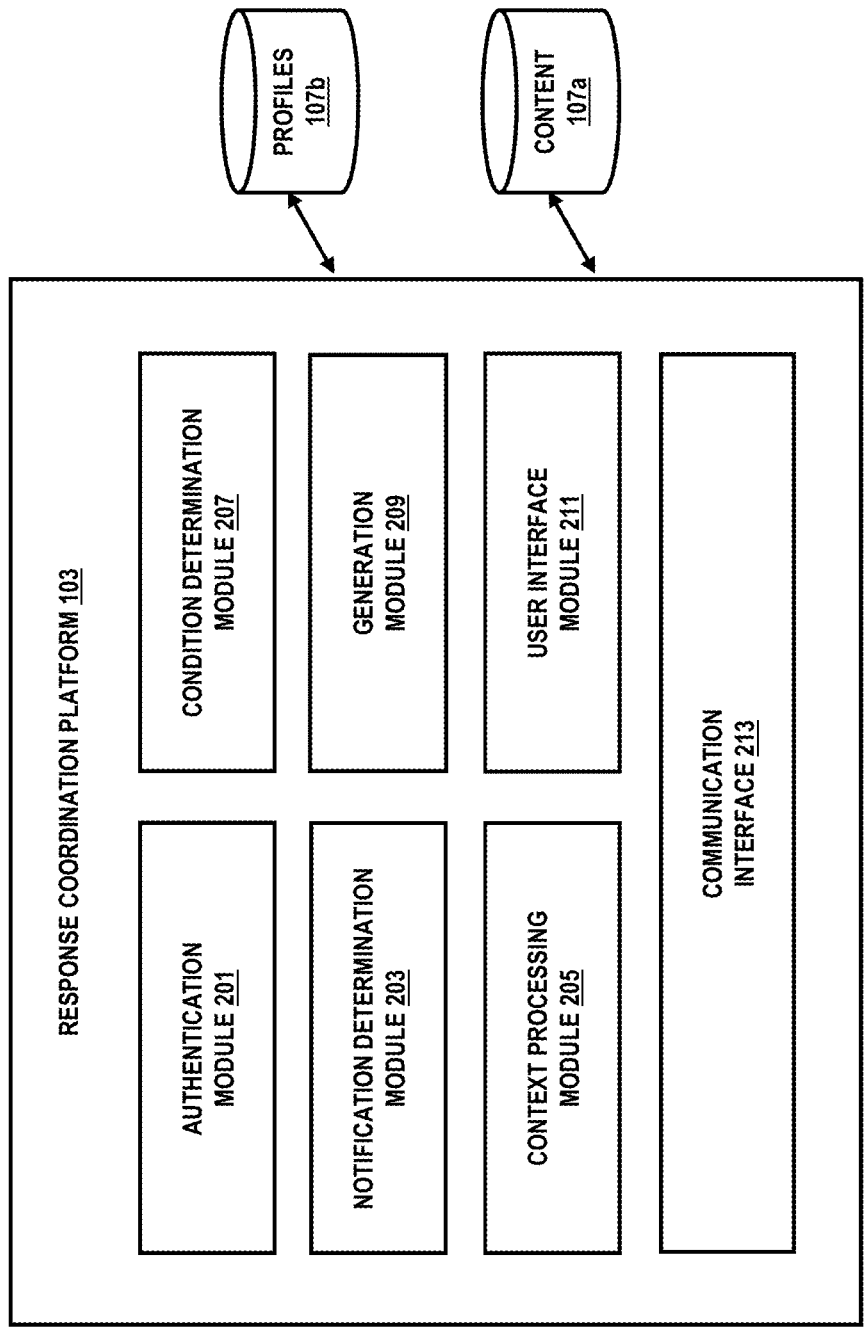
FIG. 2 is a diagram of a response coordination platform, according to one embodiment.

FIG. 2 is a diagram of a response coordination platform, according to one embodiment. The response coordination platform 103 includes various executable modules for performing one or more computing, data processing and network based instructions that in combination provide power utilization information for one or more operational states of an application across different operating systems. Such modules can be implemented in hardware, firmware, software, or a combination thereof. By way of example, the response coordination platform 103 may include an authentication module 201, a notification determination module 203, a context processing module 205, a condition determination module 207, a generation module 209, a user interface module 211 and a communication module 213. In addition, the platform 103 also accesses content data and user profile information from databases 107a and 107b respectively. It is noted that modules 201-213 may access the data maintained by these databases for executing various tasks and functions.

In one embodiment, the authentication module 201 authenticates users and user devices 101a-101n for interaction with the platform 103. By way of example, the authentication module 201 may receive a request to subscribe to the platform 103 for enabling coordination of response messages across devices. In the case of a first time subscriber to the platform 103, the authentication process may be performed in connection with a communication application 105 of a user device 101 according to a registration procedure. In addition, the authentication module 201 may operate in connection with the user interface module 211 to facilitate generation of a configuration interface for receiving user input for creating a user profile. It is noted that the input may include instructions, settings, details or the like to be associated with the user and stored to the profile database 107b.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the platform 103 (e.g., as enabled by user interface module 213). Profile information for respective subscribers may be cross referenced as part of the login process against an IP address, a carrier detection signal of the user device, mobile directory number (MDN), subscriber identity module (SIM) (e.g., of a SIM card), radio frequency identifier (RFID) tag or other identifier.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In one embodiment, the notification determination module 203 determines whether a notification is received by any of the devices specified as belonging to the user. For example, the notification determination module 203 may operate in connection with the application 105 to detect an incoming or missed call, email, text message or the like. The module 203 may further gather and process data related to the incoming or missed notification, including caller identifier information, phone number information, IP address information, or the like along with notification status information (e.g., missed call, call ongoing, call declined). It is noted that the notification determination module 203 may also operate in connection with a context processing module 205.

In one embodiment, the context processing module processes context data as gathered by the various sensors 104, applications 105 or services associated with the user devices 101, users, callers or a combination thereof. The contextual information may include speed data, position data, location data, tilt data, motion data, light data, sound data, image data, weather data, temporal data or the like. In addition, network and wireless signal information may be acquired along with device, application, service or operating system information related to the user, the caller or the user devices 101. It is noted that the contextual information may be processed by platform 103 in order to validate fulfillment of the one or more user conditions—i.e., conditions and/or instructions as specified by the user via a profile.

In one embodiment, the condition determination module 207 executes the one or more specified notification instructions or details based on fulfillment of the conditions. As such, the condition determination module 207 may operate in connection with the context processing module 205 for reaching a determination. By way of example, the condition determination module 207 may initiate generation of a response message based on receipt of a user input for selection of specific messaging content. As another example, when a call status is determined by module 203 as "missed," the module 207 may initiate generation of a missed call notification to the various other devices of the user. As yet another example, the condition determination module 207 may determine whether a match exists between a received notification and the profile for enabling one or more conditional executions.

In one embodiment, the generation module 209 operates in connection with the condition determination module 207 to generate and/or determine a response time to associate with a response message. For example, the generation module 209 may receive and subsequently process a user input as received via the user interface module 211 for configuring the response time. Alternatively, the response time may be determined based on processing of contextual information or other data associated with the user, the user devices, the caller or a combination thereof—i.e., based on the number of minutes expected before the user is free from a meeting.

Still further, the generation module 209 may generate an instruction for triggering an alert at a device that receives a notification. The alert may be triggered for execution at the response time and may include the invoking of various API instructions of the application 105 for rendering the alert at the device. It is noted that the generation module 209 may also operate in connection with the communication interface 213 to enable transmission of the instruction to the user device.

In one embodiment the user interface module 211 enables presentment of a graphical user interface for the platform 103, i.e., the configuration platform. By way of example, the user interface module 213 generates the interface in response to application programming interfaces (APIs) or other function calls corresponding to a browser application or web portal application of the user devices 101a-101n; thus enabling the display of graphics primitives. This may include the generation of messages regarding one or more messaging content options, response times, custom content or other data fields for receiving user input.

In one embodiment, a communication module 213 enables formation of a session over a network 109 between the platform 103 and the user device. By way of example, the communication module 215 executes various protocols and data sharing techniques for enabling collaborative execution between a user device 101 (e.g., mobile devices, laptops, smartphones, tablet computers, desktop computers) and the platform 103 over the network 109. It is noted that the communication interface 213 may also operate in connection with the condition determination module 207 and generation module 209 to facilitate the transmission of missed call notifications.

The above presented modules and components of the response coordination platform 103 can be implemented in hardware, firmware, software, or a combination thereof. Though depicted as a separate entity in FIG. 1, it is contemplated that the platform 103 may be implemented for direct operation by respective user devices 101a-101n. As such, the platform 103 may generate direct signal inputs by way of the operating system 104 of the device for interacting with the application 105 and accessing the application distribution service 102. In another embodiment, one or more of the modules 201-213 may be implemented for operation by respective user devices as a platform 103, hosted solution, cloud based service, or the like.

Figure 6:
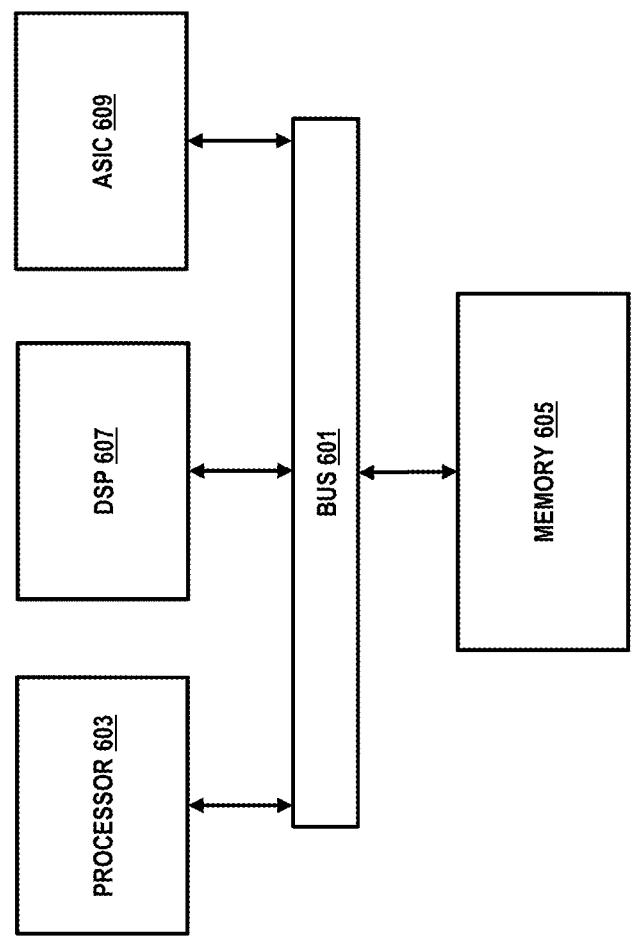
FIG. 6 is a diagram of a chip set that can be used to implement an embodiment of the invention.

FIGS. 3A-3C are flowcharts of a process for coordinating a communication response, according to various embodiments. In one embodiment, the response coordination platform 103 performs processes 300, 308 and 314 and is implemented in, for instance, a chip set including a processor and a memory as shown in FIG. 6.

In step 301 of process 300 (FIG. 3A), the response coordination platform 103 determines delivery of a notification to at least one device associated with a user. As noted, the notification may be delivered to a communication application 105 of a user device 101, such as an SMS service or phone application. In another step 303, the platform 103 determines, based on the delivery, messaging content, a user specified response time, or a combination thereof for generating a message for responding to the notification. As noted previously, the messaging content may be preconfigured or customized content as generated and/or specified by the user for responding to the user. The messaging content may also specify the response time accordingly. In step 305, the response coordination platform 103 generates, based on the response time, at least one instruction for triggering an alert, a communication session, or a combination thereof by the at least one device associated with the user, other devices associated with the user, a device that sent the notification, or a combination thereof. In step 307, the platform 103 causes transmission of the automated message, the at least one instruction, or a combination thereof to the at least one device, the other devices, the device that sent the notification, or a combination thereof. As noted, the triggering of the alert, the communication session, or a combination thereof occurs at the response time.

In step 309 of process 308 (FIG. 3B), the response coordination platform 103 receives a user input for specifying the messaging content, the response time, or a combination thereof. In another step 311, the platform 103 receives user input for specifying at least one alert type, a communication preference, one or more contacts associated with the user, or a combination thereof. The alert type may correspond to a type of alarm to initiation for notifying the user of a missed call, incoming call, or notification. The communication preference may correspond to a preferred mode of messaging for generation of the response message and may include, for example, a phone call, a video call, an email or a text. Also, the contacts may correspond to the various callers that may leave a notification—i.e., corresponding to the network of the user.

In step 313, the response notification platform 103 associates the user input with the at least one device of the user, the other devices associated with the user, or a combination thereof. Per step 315, the platform 103 generates the message for responding to the notification automatically based on the association. It is noted that the user input is provided by the user prior to the delivery of the notification, which corresponds to automated configuration of a profile for enabling response execution. Alternatively, the case where the user is prompted to provide the input after determining delivery of the notification corresponds to an interactive mode of response generation.

In step 317 of process 314 (FIG. 3C), the response coordination platform 103 determines the notification is missed by the at least one device, the other devices, or a combination thereof. In another step 317, the platform 103 determines context information associated with the user, the at least one device, the other devices, the device that sent the notification, or a combination thereof. Of note, the generating of the (a) message for responding to the notification, the (b) instruction for triggering of the alert, the communication session, or a combination thereof, or (c) a combination thereof is based on the missed notification, the context information, or a combination thereof. In addition, the platform 103 may utilize the context information to determine fulfillment of one or more user established conditions for customizing the response message.

FIGS. 4A-4G are diagrams of user interfaces utilized in the processes of FIGS. 3A-3C, according to various embodiments. For the purpose of illustration, the diagrams are described with respect to an exemplary use case of a user that employs multiple communication devices, all of which are configured to interact with the response coordination platform 103. The platform 103 facilitates execution of a response procedure at each of the devices of the user for responding to a caller.

Figure 4A:
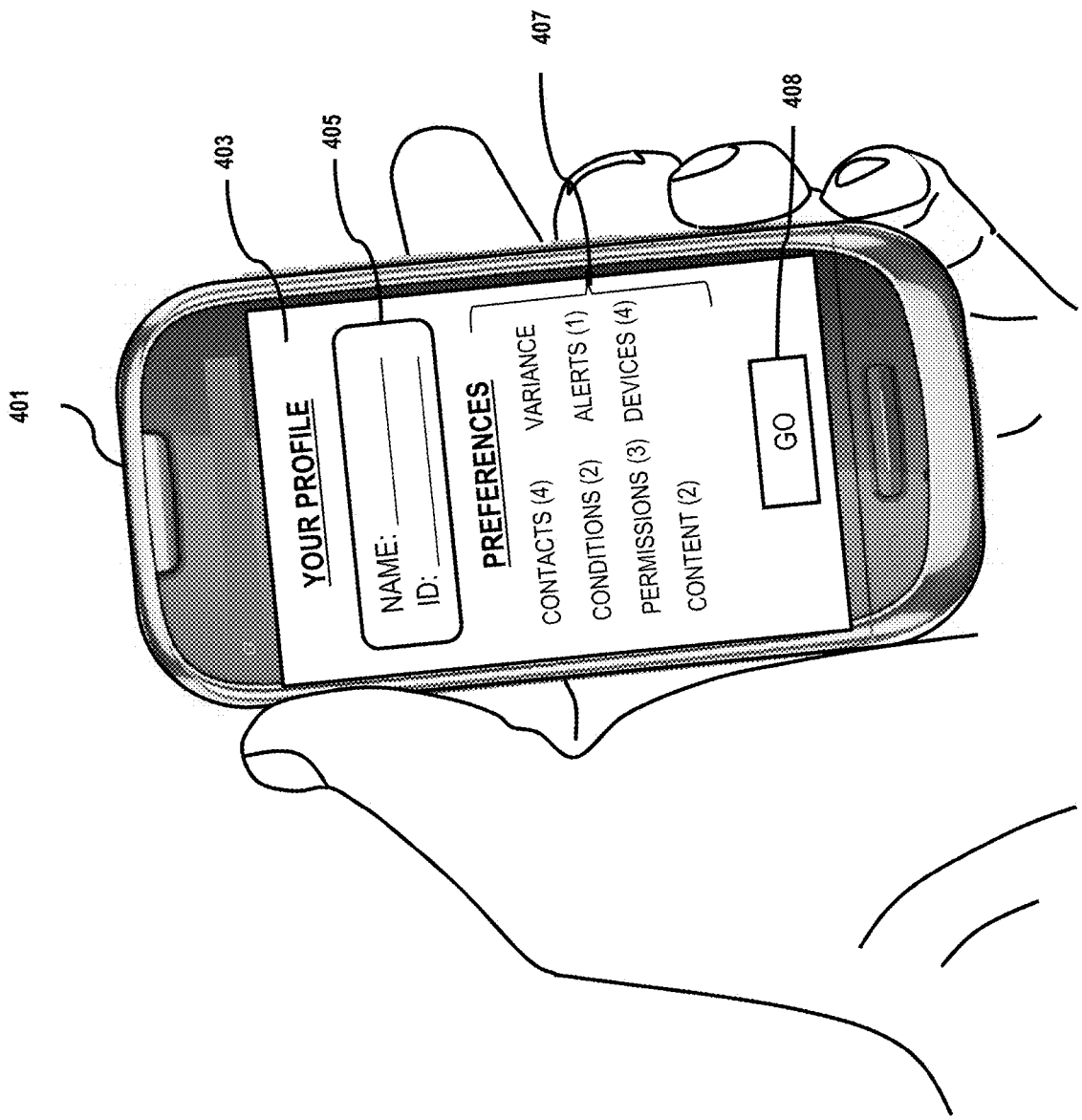

In FIG. 4A, the user device 401 accesses a configuration interface 403 of the platform 103 to establish a profile. The configuration interface features various input fields for permitting user establishment of a profile, including a name and user identifier input field 405. In addition, the user may provide input for specifying one or more preferences, which are depicted in the diagram as corresponding to different input categories 407. Each category corresponds to a selection link and/or button for enabling user provision of data.

Per selection of the CONTACTS category, the user may be prompted to specify callers to associate one or more conditional settings with. Upon selection of this category, for example, the user interface may render a list of friends, co-workers or others for the user to choose from. Alternatively, an API execution may be initiated for retrieving a social networking contact list, address book or other application of the user. In this example, a number is parenthesis of four (4) is shown next to the CONTACTS category for indicating that the user currently has 4 contacts selected.

Upon selecting the CONDITIONS category, the user is presented with various input fields for specifying conditions to be validated and executed. The CONDITIONS category is also presented for enabling the user to specify various execution conditions (e.g., IF condition 1, THEN condition 2). By way of example, the number in parenthesis next to the CONDITIONS category indicates that only 2 conditions are currently specified while 3 permissions, corresponding to the PERMISSIONS category, are specified. By way of example, the permissions category may include a permission for the user and/or user device(s) to share information with the platform 103 or with each other.

Per the VARIANCE category, the user is able to specify an amount of variance to apply with respect to the determining and/or generating of a response time. Under this scenario, when a response time of 12 minutes is determined based on one or more conditions of the user, a variance value of 5 minutes results in setting of a response time of 17 minutes. The ALERTS category, for which there is currently only 1, may be selected for enabling the user to adapt the alert type, sound intensity, scheme, etc., for rendering of notifications, response messages, etc. The user may also select the CONTENT category for specifying particular messaging content to be used for generation of a response message.

Still further, the user may specify the different communication devices they employ per the DEVICES category, which per this example corresponds to 4. In addition, the DEVICES category enables the user to select one or more user devices for receiving missed calls or other notifications regarding other devices. Hence, only those devices specified may be enabled to interact with the platform 103 for supporting automated generation and sending of response messages.

Once the profile is configured, the user selects the GO action button 408 for storing the profile in association with the user, the user identifier, the one or more devices and the device 401 in question. The user may access the configuration interface on demand, such as via the application, for adapting the profile accordingly.

Figure 4B:
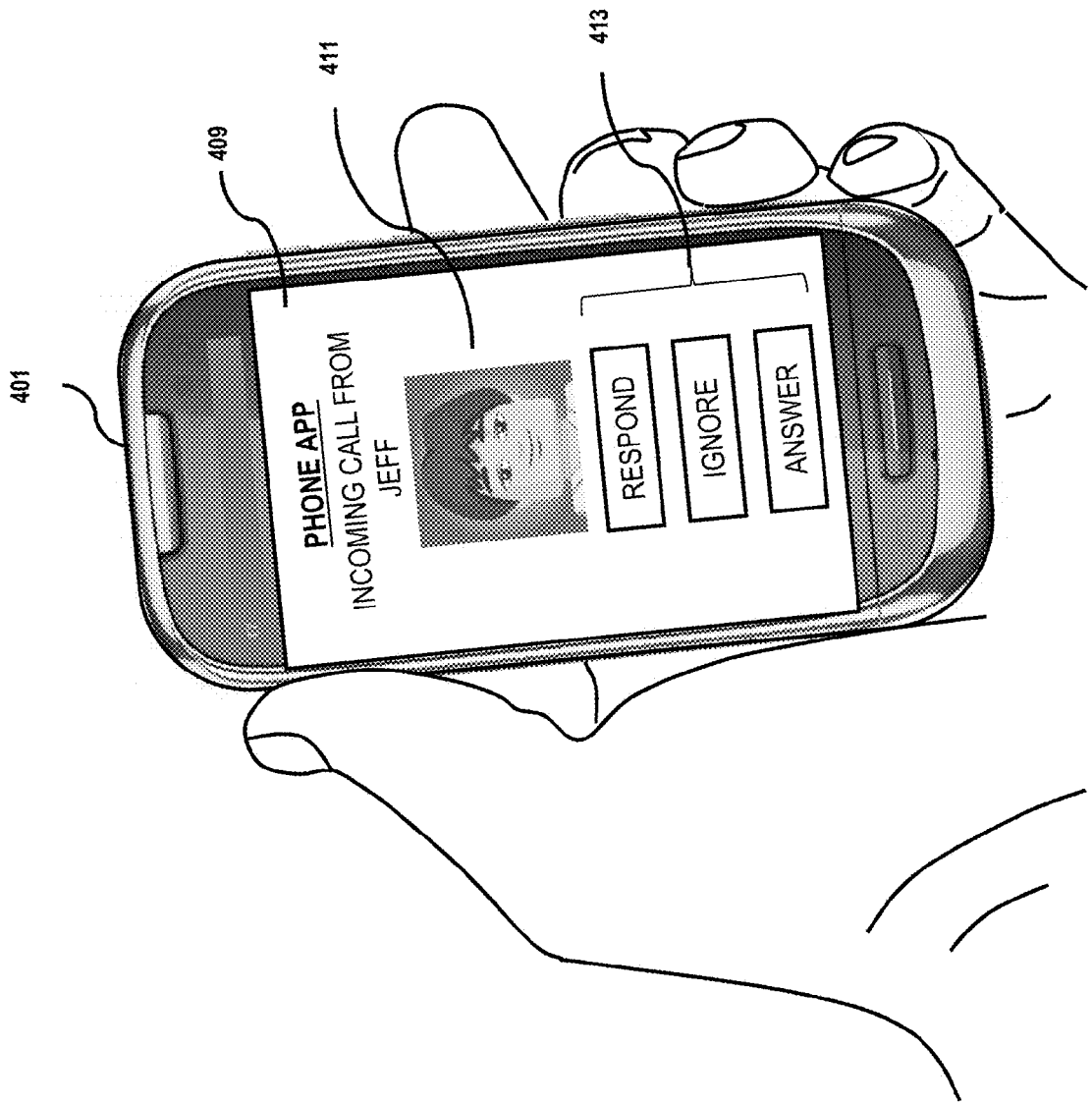
Figure 4C:
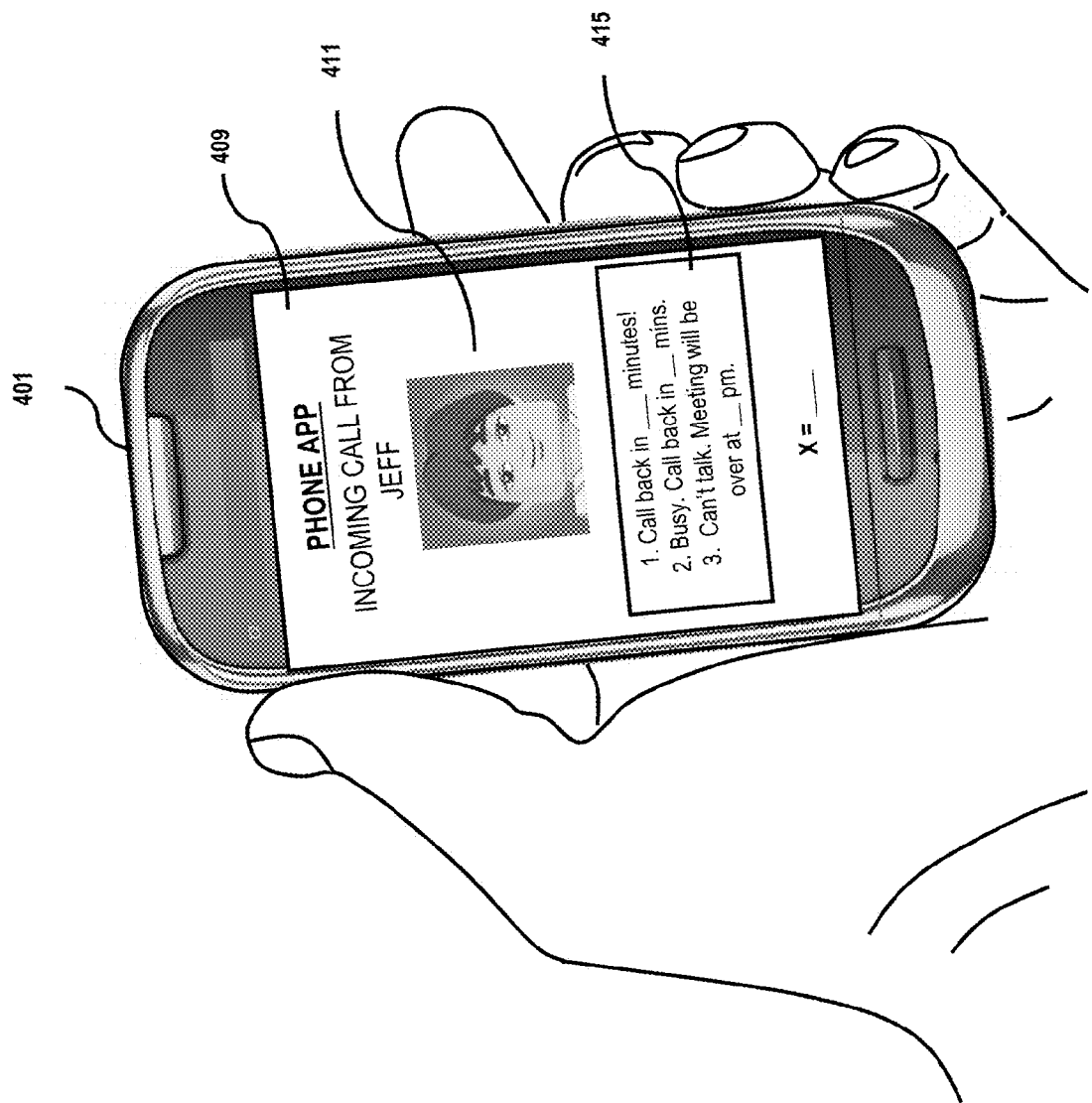
Figure 4D:
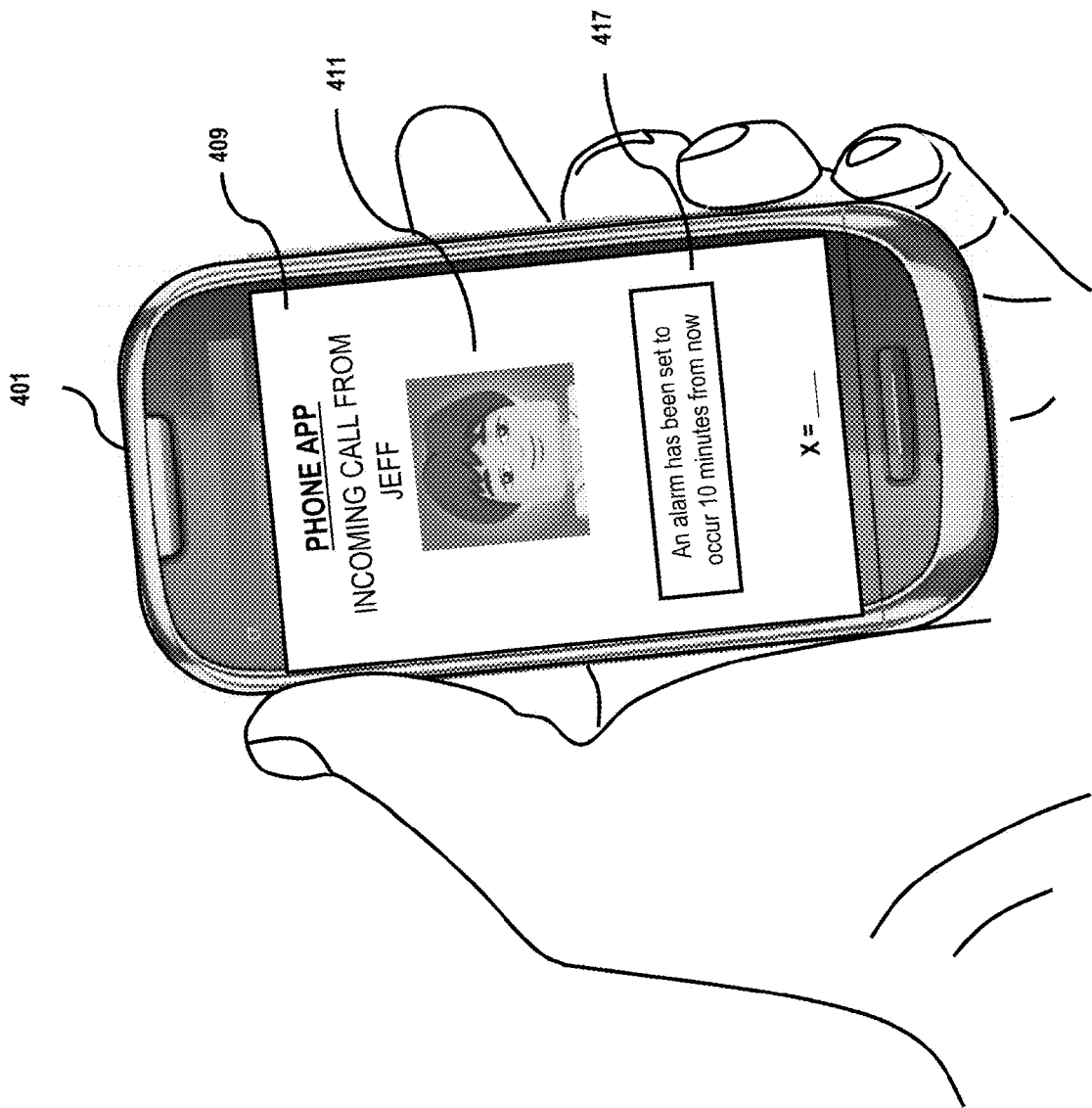

In FIG. 4B, the user receives a phone call from a contact named Jeff, that is associated with an avatar 411 via a phone calling application 409 of the device 401. In this case, Jeff does not represent a designated contact of the user profile and is therefore not subject to any conditional settings at this time. In this case, the user is presented with action buttons 413 for interacting with the platform 103 in response to the call. The user may ignore the call via the IGNORE action button or answer the call from Jeff by selecting the ANSWER action button accordingly. When the user selects the RESPOND button, however, they are prompted to select from a list 415 of preconfigured messages as depicted in FIG. 4C. Each of the preconfigured messages feature a blank space for indicating user selection of a value for defining the response time is required. Once the user selects the message content and defines the response time (e.g., 10 minutes), the platform 103 generates and transmits a response message to Jeff. In addition, as indicated in FIG. 4D per the notification prompt 417, an alarm is automatically set at the device 401 to correspond to the selected response time.

Figure 4E:
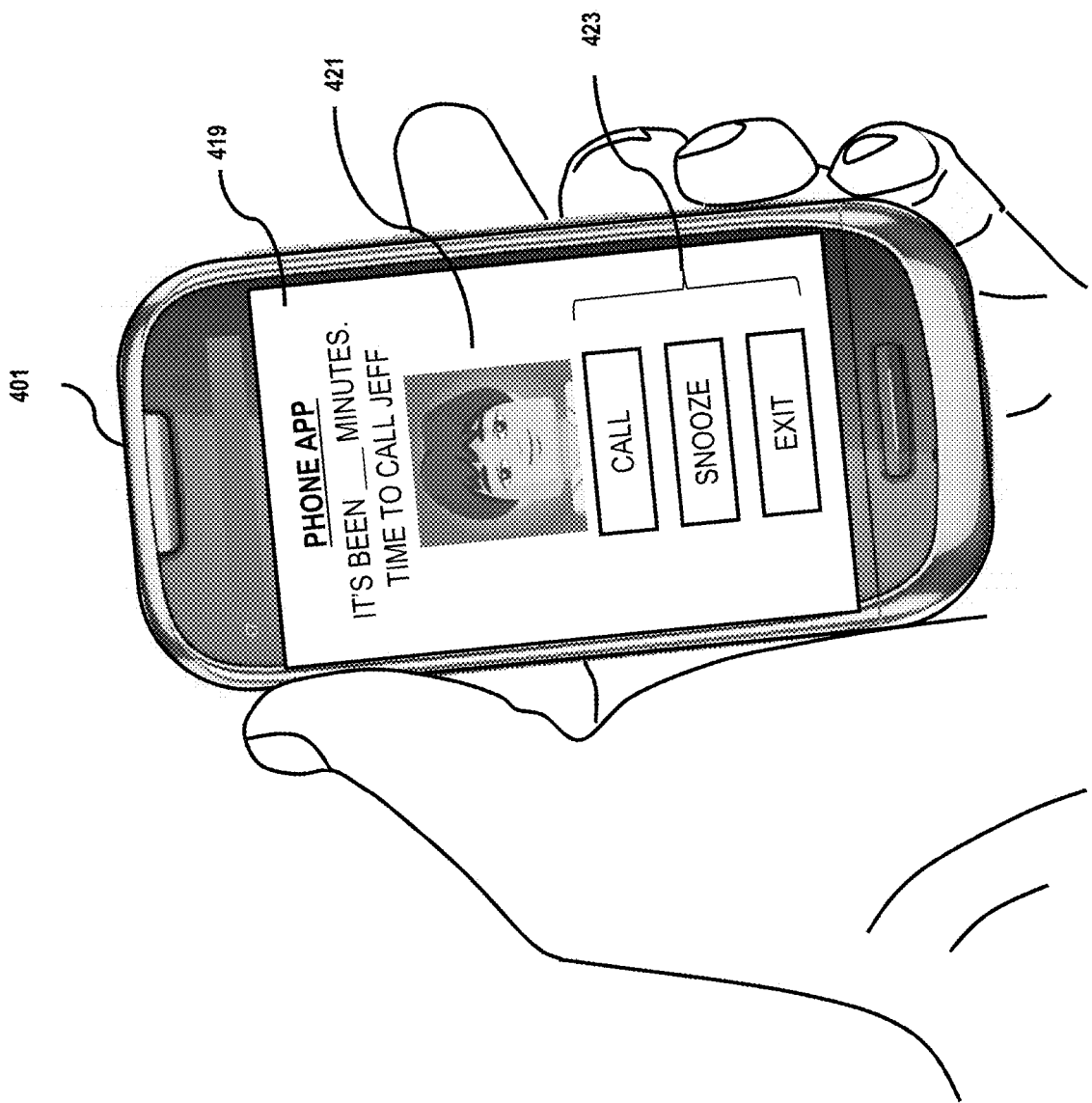

In FIG. 4E, the alarm set during transmission of the response message is triggered to occur at the lapse of the response time. In this case, the user interface presents a message via the phone application 419 for indicating that the time interval has elapsed and that a response to the caller (Jeff 421) is required. Various action buttons 423 are also presented to the display at this time, including a CALL action button for initiating a call to Jeff, a SNOOZE action button for temporarily delaying the alarm and an EXIT action button for exiting the application 419. It is noted that triggering of the alarm increases the likelihood that the user will follow-up with the caller (Jeff).

Figure 4F:
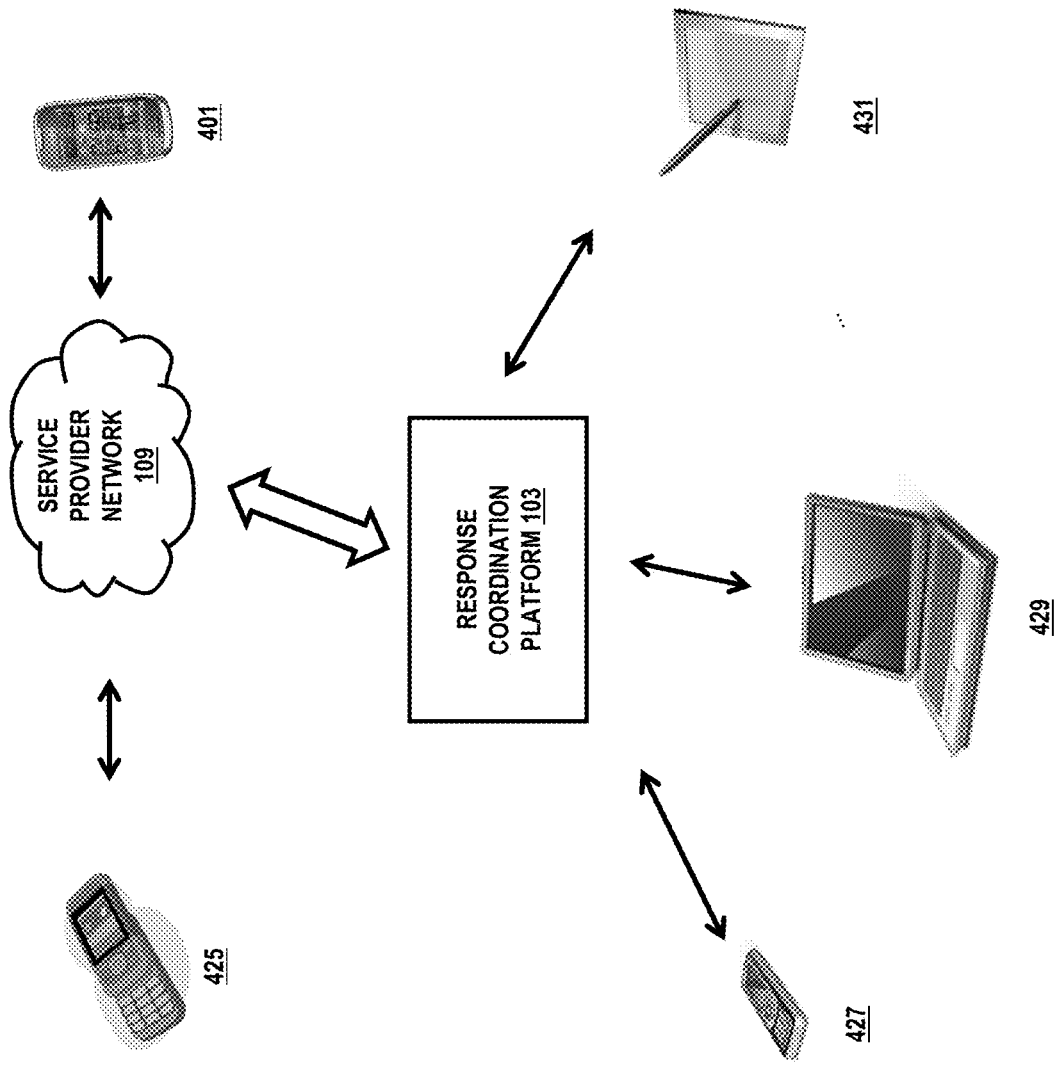

In FIG. 4F, the response coordination platform 103 facilitates sending of missed call notifications to each of the devices 427, 429 and 431 belonging to the user. This corresponds to a synchronized notification approach of the platform 103, for ensuring all devices of a common user are able to respond to a notification. In this example, a call is placed by a calling device 425 to the user device 401. Once the platform 103 determines that the call was missed, it generates a missed call notification and directs the notification to each of the devices 427, 429 and 431 of the user. This results in the presentment of a notification 435 to a user interface 433 of each of the devices, i.e., as demonstrated with respect to user device 431 of FIG. 4G. It is noted that only the devices specified by the user via the user profile receive the missed call notifications. Resultantly, the user is capable of being aware of notifications received by any of their user devices regardless of whether those devices are in their possession at the time.

It is contemplated, in future embodiments, that a missed call notification or alert instruction may be rescinded or deactivated in instances where it is determined the user followed up on a notification. For example, the platform 103 may determine that a response call was made from at least one device of the group 108. Based on this determination, the platform 103 may then submit an instruction to cancel or delete the missed call notifications transmitted to the various devices as this action is no longer required.

The processes described herein for coordinating a communication response may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
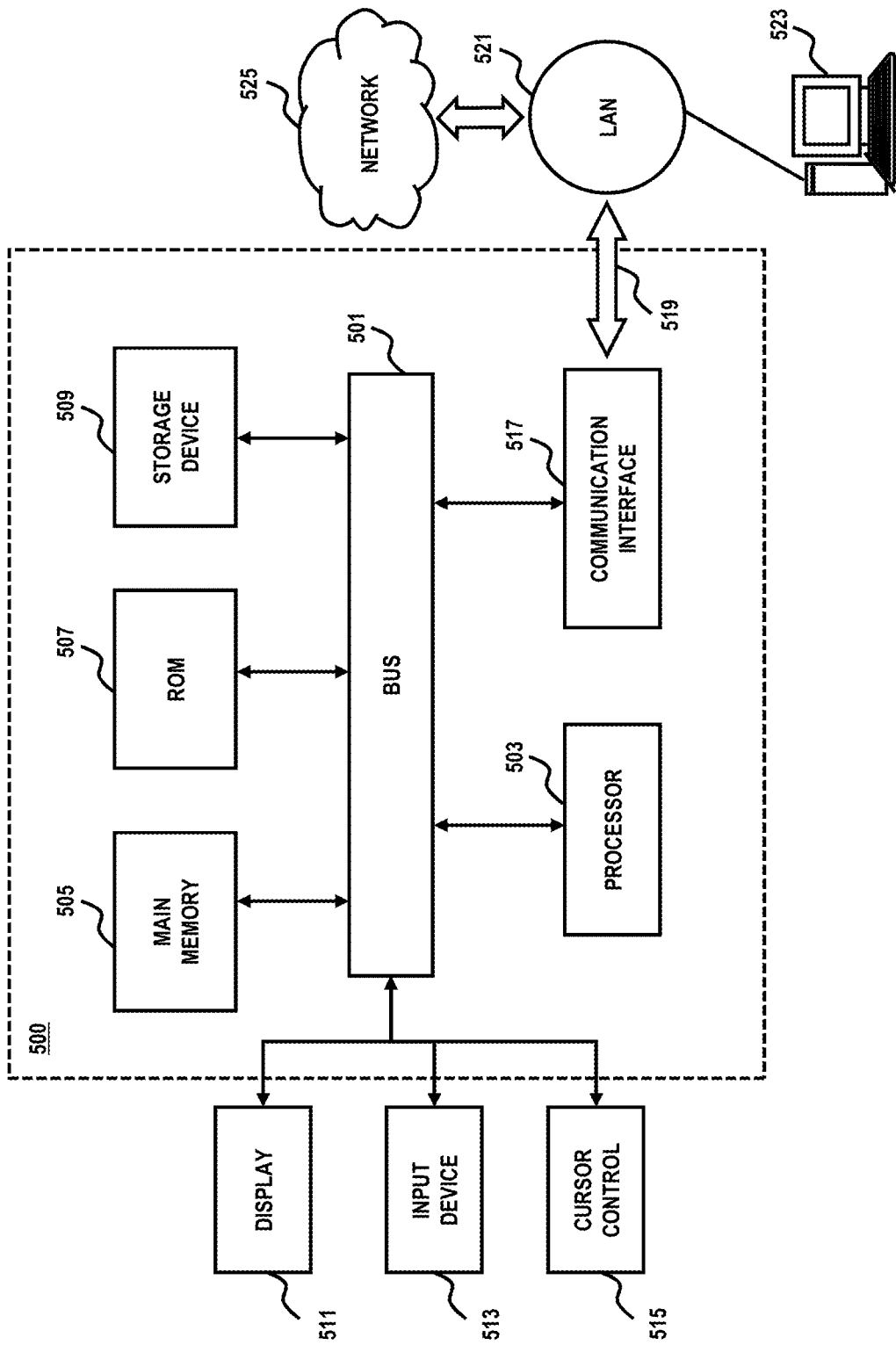
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A-4E, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to provide power utilization information for one or more operational states of an application across different operating systems as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing power utilization information for one or more operational states of an application across different operating systems.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide power utilization information for one or more operational states of an application across different operating systems. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining, by a network device, and based on a communication session initiated by a caller, delivery of a notification, of the communication session, to a plurality of devices, registered for a user;
   receiving, by the network device, and from at least one device of the plurality of devices registered for the user, and based on the delivery of the notification, a user-specified response time indicating a time when the user will respond to the communication session initiated by the caller;
   determining, by the network device, and based on the delivery, a message for responding to the notification, the message including message content and the user-specified response time;
   transmitting, by the network device, the message, including the user-specified response time, to the caller;
   transmitting, by the network device, at least one instruction for triggering an alert, at a time based on the user-specified response time, to the at least one device of the user, the alert providing a reminder of the reception of the communication session initiated by the caller;
   detecting, by the network device, an occurrence of a response communication, by the user, to the communication session initiated by the caller; and
   rescinding, by the network device and based on the detection of the occurrence of the response communication, the delivered notification to the devices of the plurality of devices other than the at least one device.

2. A method of claim 1, further comprising:
   automatically determining the response time based on a scheduled ending of a meeting in a calendar of the user.

3. A method of claim 1, further comprising:
   receiving a first user input indicating the user-specified response time; and
   receiving a second user input for specifying a communication preference indicating a type of the message that is transmitted to the caller.

4. A method of claim 3, wherein the communication preference is a phone call, a video call, an email or a text.

5. A method of claim 3, further comprising:
   generating the message for responding to the notification automatically based on the first and second user inputs.

6. A method of claim 5, wherein the first and second user inputs are provided by the user prior to the delivery of the notification.

7. A method of claim 5, wherein the user is prompted to provide the user input after determination of the delivery of the notification.

8. A method of claim 1, further comprising:
   determining that the notification was not received by the at least one device; and
   transmitting, in response to the determination that the notification was not received by the at least one device, the notification to additional devices, in addition to the plurality of devices, registered to the user.

9. A method of claim 8, further comprising:
   determining context information associated with the at least one device of the user,
   wherein the determination of the message and the generation of the alert is based on the context information.

10. A method of claim 1, wherein the notification is a phone call, a video call, an email, a text or a combination thereof.

11. A network device apparatus comprising:
    at least one processor; and
    at least one memory including computer program code for one or more programs,
    the at least one memory and the computer program code configured to, with the at least one processor, cause the apparatus to perform at least the following:
    determine, based on a communication session initiated by a caller, delivery of a notification, of the communication session, to a plurality of devices, registered for a user;
    receive, from at least one device of the plurality of devices registered for the user, and based on the delivery of the notification, a user-specified response time indicating a time when the user will respond to the communication session initiated by the caller;
    determine, based on the delivery, a message for responding to the notification, the message including message content and the indication of the user-specified response time;
    transmit the message, including the user-specified response time, to the caller;
    transmit at least one instruction for triggering an alert, at a time based on the user-specified response time, to the at least one device of the user, the alert providing a reminder of the reception of the communication session initiated by the caller;

detect an occurrence of a response communication, by the user, to the communication session initiated by the caller; and rescind, based on the detection of the occurrence of the response communication, the delivered notification to the devices of the plurality of devices other than the at least one device.

12. A network device apparatus of claim 11, wherein the processor is further configured to:

automatically determine the response time based on a scheduled ending of a meeting in a calendar of the user.

13. A network device apparatus of claim 11, wherein the processor is further configured to:

receive a first user input indicating the user-specified response time; and receive a second user input for specifying a communication preference indicating a type of the message that is transmitted to the caller.

14. A network device apparatus of claim 13, wherein the communication preference is a phone call, a video call, an email or a text.

15. A network device apparatus of claim 13, wherein the processor is further configured to:

generate the message for responding to the notification automatically based on the first and second user inputs.

16. A network device apparatus of claim 15, wherein the first and second user inputs are provided by the user prior to the delivery of the notification.

17. A network device apparatus of claim 15, wherein the user is prompted to provide the user input after determination of the delivery of the notification.

18. A network device apparatus of claim 11, wherein the processor is further configured to:

determine that the notification was not received by the at least one device; and transmit, in response to the determination that the notification was not received by the at least one device, the notification to additional devices, in addition to the plurality of devices, registered to the user.

19. A network device apparatus of claim 18, wherein the processor is further configured to:

determine context information associated with the at least one device of the user, wherein the determination of the message and the generation of the alert is based on the context information.

20. A network device apparatus of claim 11, wherein the notification is a phone call, a video call, an email, a text or a combination thereof.

* * * * *